United States Patent [19]

Benoit

[11] 4,350,896
[45] Sep. 21, 1982

[54] LIGHTER THAN AIR WIND ENERGY CONVERSION SYSTEM UTILIZING AN INTERNAL RADIAL DISK DIFFUSER

[76] Inventor: William R. Benoit, 11718 Whittier Rd., Mitchelville, Md. 20716

[21] Appl. No.: 200,103

[22] Filed: Oct. 24, 1980

[51] Int. Cl.³ .............................................. F03D 9/00
[52] U.S. Cl. ...................................... 290/55; 290/44; 244/33
[58] Field of Search ...................... 290/44, 55; 244/30, 244/33, 73, 153 R, 155 R; 415/2

[56] References Cited

U.S. PATENT DOCUMENTS

| | | | |
|---|---|---|---|
| 1,717,552 | 6/1929 | Dunn | 290/44 UX |
| 2,384,893 | 9/1945 | Crook | 244/73 |
| 2,433,344 | 12/1947 | Crosby | 244/33 |
| 2,485,543 | 10/1949 | Andreau | 290/55 X |
| 2,784,556 | 3/1957 | Perdue | 290/55 X |
| 4,073,516 | 2/1978 | Kling | 290/55 |
| 4,166,596 | 9/1979 | Houton, Jr. et al. | 290/55 X |
| 4,309,006 | 1/1982 | Biscomb | 290/55 X |

Primary Examiner—B. Dobeck
Assistant Examiner—W. E. Duncanson, Jr.
Attorney, Agent, or Firm—Nathan Edelberg; Robert P. Gibson; Saul Elbaum

[57] ABSTRACT

A lighter-than-air (LTA) wind energy conversion system (WECS) wherein the gas-filled LTA envelope carries a main rotor and electrical generator to take advantage of high wind speeds available at high altitudes. The LTA envelope is tethered to a ground based mooring system designed to provide self-orientation for the LTA envelope. In a preferred embodiment, heavy mechanical transmissions are eliminated by providing a radial disk diffuser within the LTA envelope coupled through a drive shaft to a wind-driven external rotor. Rotation of the rotor-diffuser drives an induction turbine positioned within the gas inlet to the diffuser, the lifting gas for the envelope also serving as the working fluid for the turbine. The output of the induction turbine is coupled to an electrical generator whose output is, in turn, transmitted to the ground via the tethering system.

20 Claims, 3 Drawing Figures

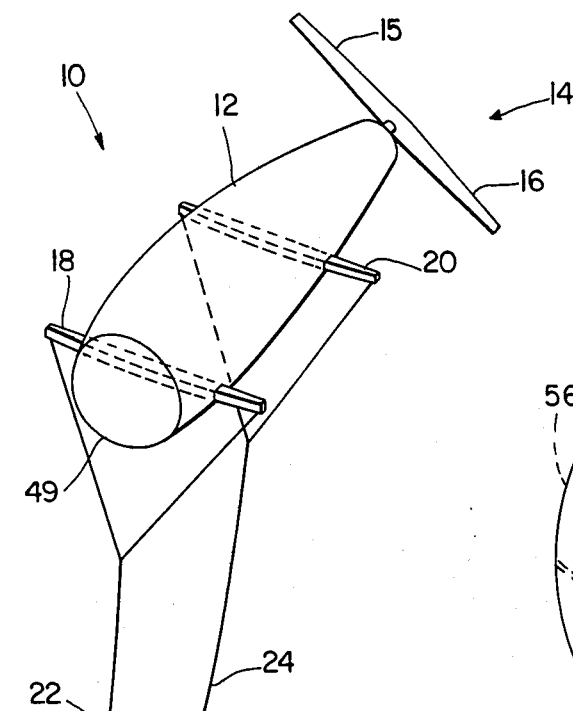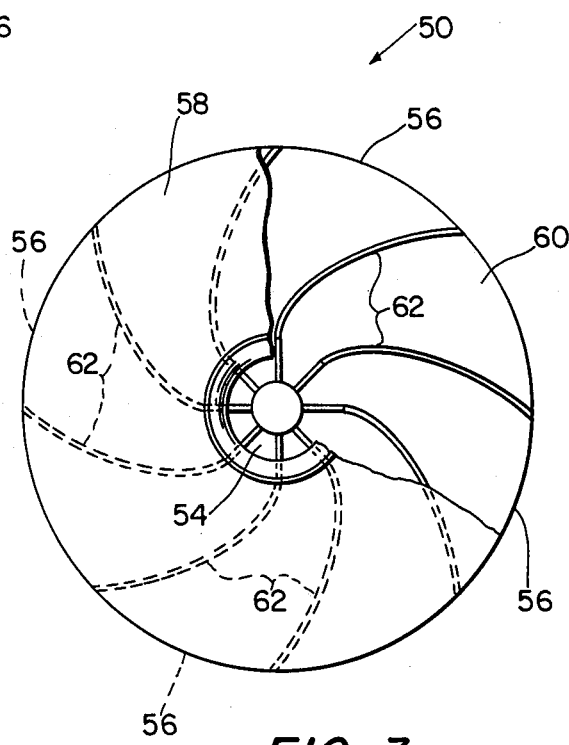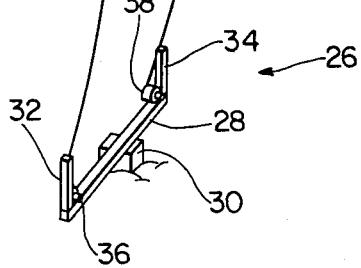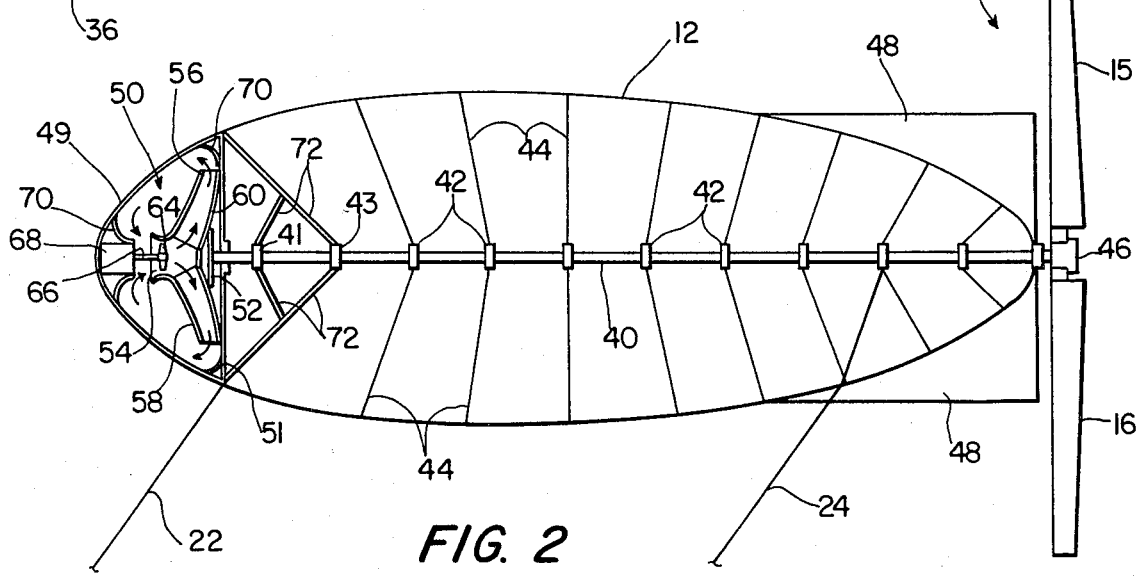
FIG. 1
FIG. 3
FIG. 2

LIGHTER THAN AIR WIND ENERGY CONVERSION SYSTEM UTILIZING AN INTERNAL RADIAL DISK DIFFUSER

RIGHTS OF THE GOVERNMENT

The invention described herein may be manufactured, used, and licensed by or for the U.S. Government for governmental purposes without the payment to me of any royalty thereon.

BACKGROUND OF THE INVENTION

1. Field of the Invention

The present invention is related to wind energy conversion systems and, more particularly, is directed towards a wind energy conversion system which is carried aloft by a lighter-than-air structure.

2. Description of the Prior Art

The advent of fossil fuel shortages has stimulated the development of alternative energy sources, and in certain regions of the world wind energy conversion systems (WECS) are becoming more efficient and competitive in generating large amounts of electricity for residential or commercial use. Commercial versions of a WECS traditionally consist of a wind-driven rotor coupled to an electrical generator which are mounted on a tower to raise the large diameter rotor off the ground and as high in the wind regime as possible.

The major challenges to a designer of a WECS are the dilute concentration of energy in the wind as well as the intermittent nature of the wind. The low power density of wind dictates that WECS of large size are required if sizable amounts of electrical power are to be generated. The intermittent nature of the wind normally results in the rendering of a WECS in an idle state much of the time. This has resulted in granting wind-generated electricity a value equal only to the fossil or nuclear fuel displaced with relatively little value granted for the capital equipment. This has seriously retarded commercial WECS development.

In addition, since the wind spectrum contains gusts and lulls, the stresses introduced into the rotor system of a WECS are large, and require rotor designs and support structures which are, to say the least, quite a challenge to the designer.

Since the power contained in the wind is a function of the cube of the velocity, the siting of a WECS becomes extremely important. Thus far, the best sites for a ground-based WECS have been on the coastlines in the northern hemisphere, as well as on mountain tops and hill tops. The latter elevations replace the high towers required to position the wind-driven rotor high enough to benefit from the velocity gradient of the wind. Unfortunately, the availability of prime high-altitude sites is severely limited, and although the cost of tower construction is greatly reduced for such sites, the expenses of road building, transporting the heavy components and subsequent erection of the WECS are high.

It is generally considered that WECS must be placed beyond the boundary layer portion of the wind in order to become inexpensive in terms of the energy yields. Additionally, a WECS must be designed to afford maximum protection against violent storms, which in the past have been primarily responsible for wind machine breakdown or destruction.

In addition to the inherent high cost attendant to the construction of a tower of sufficient height to position a large diameter (e.g., 300 foot) rotor, ground-based towers suffer from several other deficiencies. One deficiency is that there is a requirement for an open approach to the tower location, which leads to the desirability of utilizing higher altitude, but relatively inaccessible, bald hills for placement of a WECS tower. Further, construction of a tower necessarily results in a fixed height for the main rotor whose electrical generating capability is therefore at the mercy of the wind density at that particular height at any given point in time. Further, undesirable vibrations have been observed which result from what is referred to as "tower shadow" which occurs when the blade of the rotor passes adjacent to the tower and sets up a type of vibratory forcing function effect. Additionally, there are inherent energy losses due to tower drag, and it is difficult to erect, service and maintain the equipment positioned on the top of the tower.

Due to gravity loads, there presently exists a practical maximum limit for the rotor diameter of approximately 300 feet. Further, a WECS having a 300 foot diameter rotor that produces 2.5 megawatts of electricity presently costs approximately $3 million and includes a massive transmission, drive shaft and heavy bearings which add significantly to the cost of the WECS as well as complicate the tower design upon which such a massive system must be positioned. For example, a mechanical transmission required for a 300 foot diameter rotor would weigh approximately 150–200 tons.

In addition to the foregoing drawbacks, a conventional WECS requires yaw motors, bull rings and the like, to turn the main rotor as the wind shifts direction in order to maintain effective orientation. Such yaw motors and associated controls are expensive for large diameter rotors, are very slow to react, and add to maintenance and servicing problems.

There is a type of WECS which is known to obviate the need for a mechanical transmission. Such a WECS is known in the art as an Enfield-Andreau wind machine (see page 18 of "Wind Machines" by Frank R. Eldridge, The Mitre Corporation, October 1975). The Enfield-Andreau wind machine operates on a depression principle wherein the blades of the propeller are hollow and are provided with apertures at their tips. Generally, the interior of the blades communicate through an air passage in the hub of the propeller with the outlet of an air turbine which is coupled to an electric generator. When the wind velocity is of a value sufficient to cause rotation of the propeller, the air within the hollow blades is induced, by reason of the centrifugal force generated by its own mass, to flow out through the apertures in the blade tips thereby forming a depression (i.e., a pressure lower than that of the surrounding atmosphere) within the hollow blades. The air within the air turbine is then at a higher pressure than that of the air remaining within the blades, therefore establishing a continuous flow of air through the air turbine, the hub, the interiors of the blades and out through the apertures at the tips. The flow of air through the air turbine supplies power to drive the electric generator. A typical Enfield-Andreau WECS is set forth, for example, in U.S. Pat. No. 2,784,556 to Perdue. Such a ground-based system, however, still requires the propeller hub to be capable of rotation about a vertical axis in order that it may face into the wind. Additionally, a conventional Enfield-Andreau WECS requires the incoming air to make at least three 90° turns prior to expulsion through the propeller tips. Such a system inherently loses energy that it otherwise might have. Further, a ground-based Enfield-Andreau WECS suffers from the same deficiency set forth above with respect to other WECS, namely, the inability to take advantage of the high wind power densities found at considerable altitudes off the ground.

I am also aware of U.S. Pat. No. 4,073,516 which issued Feb. 14, 1978 to Kling. In this patent, the advantage of replacing a tower-based WECS with a gas-filled hollow body that carries a rotor assembly, current generator and alignment means is recognized. However, the apparatus disclosed in this patent for accomplishing these noteworthy objectives are complex. Initially, the system requires an alignment assembly for aligning the rotor to face into the wind, a ground anchor, and at least one captivating stay connecting the floating power plant to the anchor. The support body is connected to the captivating stay through a joint connection requiring three degrees of freedom. The rotors are gimbal-mounted at a variable relative position with respect to the support body but in fixed positions relative to one another. Additionally, the rotor assembly requires at least one pair of coaxially and coplanarly mounted counter-rotating rotors having their moments of momentum compensated. Again, while this patent does recognize the noteworthy advantage of elevating a wind-driven power plant into high-altitude winds by means of a lighter-than-air structure, the means for accomplishing same, it is felt, leaves much to be desired and may be impractical.

In my co-pending U.S. patent application, filed concurrently herewith and entitled "A LIGHTER THAN AIR WIND ENERGY CONVERSION SYSTEM UTILIZING AN EXTERNAL RADIAL DISK DIFFUSER," I set forth the combination of a lighter-than-air wind energy conversion system wherein the LTA envelope carries a main rotor and electrical generator to take advantage of high wind speeds available at high altitudes. The heavy mechanical transmission of the prior art are eliminated by providing a radial disk diffuser that rotates with the main rotor. Such rotation drives an induction turbine positioned within a substantially linear duct which is preferably located along the longitudinal axis of the LTA envelope. The apparatus set forth in said co-pending application takes advantage of, while improving upon, the depression turbine principles described above in connection with the Enfield-Andreau WECS.

While the design set forth in my co-pending application described above is an improvement over the prior art, there may be a few aspects of the design which may prove difficult from an engineering standpoint. One of these aspects is the provision of the longitudinal duct which extends along the centerline axis within the envelope whose front end forms a ram air inlet at the front of the envelope and whose rear end is in fluid communication with the rearwardly mounted disk diffuser. The front end of the duct, being open to the atmosphere, may be subjected to the possibility of ingress of debris, birds or other contaminating materials which could cause damage to the extraction turbine-generator structure positioned forwardly in the duct. Further, such debris could impede the efficient operation of the fluid-based system. Additionally, since the envelope around the duct contains a lighter-than-air gas, such as helium or hydrogen, highly effective seals need to be formed at both ends of the duct where it merges with the envelope structure. Such seals may be costly, as well as a source of potentially troublesome maintenance. Finally, the rotor-diffuser assembly, located at the rear of the envelope, does not weigh an insubstantial amount, and there may be some engineering difficulties in properly mounting the diffuser-rotor assembly to the rear of the duct as well as in maintaining balance of the overall structure.

While the potential disadvantages pointed out above with respect to the device set forth in my co-pending application are not believed insurmountable or debilitating, it nevertheless would be highly desirable if such engineering problems could be overcome by a different design. It is towards achieving this general objective that the present invention is advanced.

I am also aware of the following U.S. patents which, together with the above-noted references, are considered by me to be the closest prior art to my invention: U.S. Pat. Nos. 1,717,552; 2,384,893; 2,433,344; and 3,936,652.

OBJECTS AND SUMMARY OF THE INVENTION

It is therefore a primary object of the present invention to provide a wind energy conversion system (WECS) which is coupled with a lighter-than-air (LTA) structure for taking advantage of high energy density winds at high altitudes in a more efficient and economical manner than heretofore possible.

Another general object of the present invention is to provide a wind energy conversion system which overcomes the disadvantages and deficiencies noted above with respect to prior art WECS structures.

A further general object of the present invention is to provide a wind energy conversion system which totally eliminates the complications associated with ground-based systems, including those associated with tower structure and cost.

An additional object of the present invention is to provide a wind energy conversion system which permits withdrawal of the system from the wind regime prior to the advent of a storm in order to protect the system against damage.

An additional object of the present invention is to provide a WECS which may be positioned in any desirable location, such as in a valley, off-shore, in marshland, and other locations heretofore thought inappropriate for an efficient WECS.

Another object of the present invention is to provide a wind energy conversion system in combination with a lighter-than-air structure which is self-orienting and includes aerodynamic damping of orientation motions.

An additional general object of the present invention is to provide a wind energy conversion system which is much more efficient and hence more economical than prior art systems, which greatly reduces stresses impinging on the rotor, and which is relatively easy to erect, maintain and service when compared to ground-based WECS.

An additional object of the present invention is to provide a wind energy conversion system which requires very little site preparation, has little impact on the environment, is virtually pollution-free, noise-free and is visually unobjectionable.

A further important object of the present invention is to provide an airborne wind energy conversion system which eliminates the need for a mechanical transmission and thereby greatly reduces the weight of the system required to be airborne.

Another important object of the present invention is to provide an LTA-WECS which can produce, for example, the same amount of electricity with a rotor of one-fourth the size of a ground-based WECS, or can achieve four times the power as may be obtained for the same size rotor on a tower-based WECS.

A still further object of the present invention is to provide a lighter-than-air wind energy conversion system which overcomes the potential disadvantages of the design set forth in my co-pending application discussed above which include, more particularly, those associated with the longitudinal duct as well as the rearwardly-mounted external diffuser.

A still further object of the present invention is to provide an LTA-WECS which incorporates a diffuser gas pump positioned with respect to the rotor blade in a manner so as to more easily balance the overall weight of the system.

An additional of the present invention is to provide a wind energy conversion system in a gas-filled lighter-than-air envelope which utilizes the lifting gas within the envelope as the working fluid to power the extraction turbine while still utilizing freestream air to power the main rotor.

Another object of the present invention is to provide a wind energy conversion system supported by a gas-filled, enclosed lighter-than-air vehicle within which much of the machinery is positioned and which eliminates the need for an elongated duct for communicating fluid between the diffuser and the extraction turbine.

The foregoing and other objects are attained in accordance with one aspect of the present invention through the provision of apparatus which comprises a lighter-than-air structure including an enclosed gas-filled envelope and means supported by the lighter-than-air structure for generating electricity. Such means includes a main rotor adapted to be rotated by the wind, a diffuser mounted within the envelope and coupled to rotate with the main rotor, a turbine in fluid communication with the diffuser, and an electrical generator coupled to the turbine. Means are preferably connected between the lighter-than-air structure and the ground for tethering the structure and for delivering electricity from the generator.

In accordance with more specific aspects of the present invention, the diffuser includes a gas inlet, a gas outlet, and a plurality of vanes, one end of each of the vanes positioned adjacent the gas inlet while the other end of each vane is positioned adjacent the gas outlet. The diffuser preferably further comprises a pair of cover plates between which the vanes are mounted, the gas inlet positioned in the center of one of the plates while the gas outlet is positioned on the periphery between the two plates. The vanes are preferably curved and extend radially outwardly from the gas inlet to the gas outlet. The main rotor preferably comprises a pair of rotor blades connected to a hub, and a drive shaft is provided to connect the hub to the diffuser so that the diffuser rotates therewith.

The turbine is preferably within the gas inlet of the diffuser to eliminate the need for the long duct of my other device. More particularly, the turbine, diffuser and generator are preferably positioned within a nose cowling formed at the fore portion of the envelope, and the diffuser is adapted, upon rotation, to draw gas from the gas-filled envelope, through the gas inlet and expel same through the gas outlet. The turbine preferably includes impeller blade means adapted to be rotated by the gas drawn through the gas inlet of the diffuser. The electrical generator is preferably positioned forwardly of the turbine.

In the preferred embodiment, the drive shaft extends through the envelope substantially along the longitudinal axis thereof. Bearing means are preferably positioned at spaced locations along the drive shaft for supporting same, and means connected to the lighter-than-air structure are provided for supporting the bearing means. The bearing means may comprise gas bearings that utilize the lifting gas within the envelope. The means for supporting the bearing means may include a rigid support structure coupled to the forwardly positioned bearing means as well as support hangers extending from the framework of the lighter-than-air structure coupled to the remaining bearing means.

In a preferred embodiment, the main rotor is connected to the rear of the lighter than air structure and rotates in a plane which is substantially perpendicular to the longitudinal axis of the structure.

In accordance with other aspects of the present invention, the means connected between the lighter-than-air structure and the ground preferably comprises at least one tethering cable means and at least one electrical cable means. Preferably provided on the ground are means for mooring the cable means which includes means for selectively drawing in the cable means and thereby bringing the structure closer to the ground. More particularly, the cable means may include at least two cables one of which is connected to the fore portion of the structure, the mooring means including a beam which is pivotally coupled to a support pedestal and includes a cable connected preferably through a winch to each end thereof. In the LTA-WECS, the cables are connected to a pair of fore and aft outriggers that extend laterally from the lighter-than-air structure.

BRIEF DESCRIPTION OF THE DRAWINGS

The foregoing and other objects, aspects, uses and advantages of the present invention will become more fully appreciated as the same becomes better understood from the following detailed description of the present invention when considered in connection with the accompanying drawings, in which:

FIG. 1 is a perspective view of a preferred embodiment of the present invention;

FIG. 2 is a longitudinal sectional view of the lighter-than-air structure of FIG. 1; and FIG. 3 is an enlarged, partially broken front view of a preferred embodiment of the radial disk diffuser illustrated in FIG. 2.

DETAILED DESCRIPTION OF THE PREFERRED EMBODIMENT

Referring now to the drawings, wherein like reference numerals represent identical or corresponding parts throughout the several views, and more particularly to FIG. 1 thereof, reference numeral 10 indicates generally a preferred embodiment of a lighter-than-air wind energy conversion system (LTA-WECS) of the present invention.

The LTA-WECS 10 includes a lighter-than-air gas-filled enclosed envelope 12 which may be made of a rigid construction or of a flexible material such as a rubberized fabric of suitable properties on a rigid structure. A flexible construction reduces stresses, but may exhibit slightly higher drag than a rigid construction. Envelope 12 acts as a plenum in a manner to be described in greater detail below. Shown mounted on the rear portion of the envelope 12 is a wind-driven rotor 14. The main rotor 14 need not necessarily be mounted at the rear of envelope 12, but may be positioned in any suitable location.

Positioned in the fore portion of envelope 12 within a nose cone 49 is a generator structure (not shown in FIG. 1) which will be described in greater detail hereinafter.

Extending laterally from the body of envelope 12 are a pair of fore and aft outrigger assemblies 18 and 20. Connected to the ends of outriggers 18 and 20 are a pair of tethering cables 22 and 24, respectively. One of the tethering cables 22 and 24, or both, may include an electrical conductor for transmitting the energy output by the electrical generator to the ground. Of course, another function of cables 22 and 24 is to provide means for retaining the craft 10 at a desired altitude. Cables 22 and/or 24 may consist of a strong material, such as Kevlar ®, as an outer insulator for a center conductor, or separate tethering cables and electrical conductors may be provided, as may be desirable. Excess lift provided by the LTA envelope 12 will keep tethering cables 22 and 24 taut and the LTA envelope 12 in the desired wind regime. While a single tethering cable may work as well, the double tethering arrangement illustrated in FIG. 1 is preferred since it will maintain the LTA envelope 12 rigidly in a horizontal position as the system 10 translates downwind and upwind. Preferably, the LTA envelope 12 is designed with its center of lift co-located with its center of gravity, one of the tethering cables such as 24 being attached just below the center of gravity. The cable tethering system illustrated in FIG. 1 allows the structure 12 to translate in the downwind direction when impacted by a gust, thereby relieving the stresses on the system 10. When the gust expires and the lull begins, the restoring force from the lift vector of the envelope 12 will translate the vehicle into the wind thereby regaining the energy of the gust. This feature results in a smoothing of the velocity profile of the wind and, therefore, smooths the stresses or loads on the rotor 14.

The lower ends of the tethering cables 22 and 24 are secured to a mooring system which is indicated generally by reference material numeral 26. Although the mooring system 26 could take any of a number of forms, in the preferred embodiment, the mooring system 26 includes an elongated beam 28 which is pivotally coupled at its center point to a support pedestal 30 (e.g., concrete) which is affixed in the ground. A pair of mooring stanchions 32 and 34 are provided at the ends of beam 28 to permit the LTA envelope 12 to be secured during bad weather. For this purpose, a pair of winches 36 and 38, or the like, may be provided for drawing in cables 22 and 24, respectively.

The pivoting beam 28 allows the system 10 to be self-orienting without experiencing the undesirable dynamic interaction between the prior art tower and rotor (referred to as "wind shadow"). Since the tethering system requires no tower, "tower shadow" is no problem. The preferred embodiment of the invention achieves aerodynamic damping by the envelope 12 in both pitch and yaw. Roll damping will be provided by the cable tethering system, and self-orientation eliminates the need for yaw motors, yaw dampers, yaw gear preload, ring gears, power to drive the yaw system, and associated inspection, repair and maintenance.

The stanchions 32 and 34 permit the airframe 12 to be rigidly connected to the beam 28 thereby permitting cable inspection, repair and maintenance to occur very easily. The loads on the beam 28 when the LTA envelope 12 is drawn down will be substantially identical to the loads when the LTA envelope 12 is aloft.

Referring now to FIG. 2, there is illustrated a longitudinal section view of the LTA envelope 12 of FIG. 1. Envelope 12 is preferably filled with helium, although other suitable lighter-than-air gases may be utilized.

The main rotor 14 includes conventional tapered rotor blades 15 and 16 which are connected to a central rotor hub 46. Extending down the longitudinal axis of envelope 12 is a drive shaft 40, which may be hollow, and is supported by a plurality of spaced bearings, which may be gas bearings, that are, in turn, held in place by a plurality of support hangers 44 which are affixed to the inside of the outer frame of envelope 12.

The drive shaft 40 may be made of a composite material, such as fiberglass, Kevlar ®, or carbon-graphite epoxy. The latter material is preferred to reduce weight and provide increased stiffness. A hybrid construction of glass and carbon-graphite provides excellent qualities of strength, fatigue tolerance and light weight. The forward end of drive shaft 40 is preferably affixed to the support structure 51 of nose cone 49 to insure that rapid velocity increases in the wind speed, i.e., gusts, are transferred to the envelope 12.

Each of the support hangers 44 may incorporate a disk brake mechanism (not shown) which would be preferably spring-loaded in its locked or drive shaft-stopped position. Upon activation of the starting sequence of the system, the brakes would be unlocked with solenoids. The device can incorporate a fail safe mechanism which would stop the rotation of the drive shaft 40 and the rotor 14.

The lifting gas, such as helium, positioned within envelope 12 may be utilized as the gas for gas bearings 42. Such a feature would further reduce cost and weight, as well as extend the life of the bearings. The drive shaft 40 may be hollow and thereby provide an ideal accumulator for the gas supply to bearings 42.

The envelope 12 may be provided, if desired, with directional fins 48 positioned on the aft portion thereof. At the forward end of envelope 12 is formed the hollow nose cone or fairing 49 which may be constructed, for example, of aluminum or fiberglass which serves to transmit gust loads to the envelope 12. A support structure 51 is provided which is preferably of an open framework construction to allow free flow of the lifting gas to the fore portion of the envelope within nose cone 49.

Affixed to the forward end of drive shaft 40 by means of, for example, a mounting plate 52, and positioned within nose cone 49, is a radial disk diffuser indicated generally by reference numeral 50. Diffuser 50 rotates with shaft 40 and hence rotor 14, and acts as a speed increasing device, as will become more clear hereinafter.

The radial disk diffuser 50 includes, as seen in FIGS. 2 and 3, a relatively small gas inlet opening 54 along with gas outlet ports 56 positioned on the periphery thereof. The inlet and outlet ports 54 and 56 are defined by a somewhat conical front plate 58 and a somewhat congruently shaped rear plate 60. The fore portion of front plate 58 is curved forwardly to form the gas inlet opening 54.

The front and rear plates 58 and 60 enclose a plurality of curved radially extending vanes 62 which, together with plates 58 and 60, form fluid flow passages for the helium gas. Vanes 62 are preferably fastened between plates 58 and 60, and may be curved backwardly from their "normal" orientation to provide higher efficiency for the air pump or diffuser 50.

Positioned within the gas inlet opening 54 of the diffuser 50 is a substantially conventional vaneaxial extraction turbine 64 which is adapted to be rotated by the circulating gas flow through the diffuser inlet 54 and outlets 56. The impeller blades of turbine 64 may rotate in the opposite direction or in the same direction as diffuser 50, based upon an engineering analysis.

Connected to rotate with the impeller baldes of turbine 64 is an output shaft 66 which is coupled to an electric generator 68 mounted in the fore portion of nose cone 49. Inside nose cone 49 may be provided fluid guides 70 for smoothing the gas flow through the diffuser 50 to thereby reduce losses and increase efficiency.

Rigid support struts 72 preferably extend rearwardly from the nose cone 49 and its support plate 51 to the forwardmost two bearings 41 and 43. The strut structure 72 coupled to the forward bearing 41 serves to transmit the gust loads to the drive shaft 40 along with the aft cable 24 which will tend to pull the shaft 40 rearwardly. The portion of the strut structure 72 coupled to the second bearing 43 stabilizes the structure further and provides increased stiffness. The support struts 72, as well as support 51, are of an open framework in order to permit free passage of the lifting gas to the forward cavity within nose cone 49.

In operation, the freestream wind flowing around the LTA envelope 12 and through the rotor blades 15 and 16 cause rotation of the main rotor 14 and its direct-coupled drive shaft 40. The drive shaft 40 is, in turn, coupled to rotate the diffuser 50 which acts as a gas pump to circulate the lifting gas (e.g., helium) located within envelope 12, and more particularly within nose cone 49, through its inlet 54 and outlets 56. This gas flow, in turn, actuates the axial flow extraction turbine 64 which, in turn, rotates the generator shaft 66. In this manner, the generator 68 rotates at a high rpm to generate electricity which is transmitted to the ground via cable/connectors 22 and/or 24.

The extraction turbine 64 preferably comprises a motor/generator which allows an extremely light main rotor 14 of high-tip speed ratio and efficiency. Further, the working fluid for the main rotor (air) has different properties from the working fluid for the diffuser 50 (helium). This difference allows higher rpms and therefore higher average efficiency. Furthermore, the diffuser 50 provides a flywheel effect which will smooth the entire dynamic system.

The provision of extraction turbine 64 as a motor/generator permits electric starting which allows the main rotor 14 to have a zero degree geometric pitch angle to yield a higher peak power coefficient and zero starting torque when stopped. This eliminates the need for pitch change mechanisms and speed brakes for overspeed. The generator will achieve overspeed protection through inlet conditions (i.e., sonic flow upper limits). The main rotor 14 will be controlled by this feature as well. Above the maximum allowable generating speed, the rotor brakes (not shown) are activated, thereby shutting the turbine down. The system is designed to survive extremely high winds both when running and stopped. The lightweight rotor will advantageously provide a cascading weight reduction throughout the entire system.

The above-described suspension system for drive shaft 40 relies upon the inertia of the envelope (which includes the lifting gas) to damp the vibrational loads of the drive shaft 40.

Energy losses in the form of heat will cause the surface of the envelope 12 to be heated, thereby preventing ice formation.

The present invention provides a helium environment for the entire mechanism except for the main rotor 14, hub 46, and a small portion of the drive shaft 40. Preferably, the exterior of the envelope 12 is treated with an appropriate environmental treatment.

Due to the recirculation of the lifting gas during operation, the apparatus of the present invention should provide long life due to the exclusion of moisture and debris and elimination of erosion problems. A simple pitot/static system may provide the input for the control system which would be exclusively fluidic except for electric starting and total shutdown. Regarding the emergency brake system (not shown) if several disk brakes are provided, redundancy is high and the circulating helium gas acts as an excellent heat exchanger fluid to prevent brake overheating. The apparatus is fire safe since the generator is immersed in helium.

In the event the drive shaft 40 is hollow, so as to provide an accumulator for the gas bearings 42, the pump (not shown) for such purpose may be directly driven by the motor-generator 64 and may be mounted, for example, at the aft end of the generator. A pressure switch (not shown) may be provided to sense a low pressure condition to actuate the drive shaft brakes to protect the system.

The disk diffuser 50 is designed to reduce the weight of the device to allow same to take advantage of yet higher vertical wind velocity gradients. By mounting the diffuser 50 in the fore portion of the craft, there is inherently sufficient space required for mounting thereof, plus the weight of the main rotor 14 becomes very well balanced, thereby smoothly transfering any vibratory loads to the envelope 12.

The diffuser disk fan 50 may be constructed of, for example, fiberglass to provide a lightweight, durable structure. Further, it may be appreciated that the gas inlet 54 and the gas outlets 56 require only one 90° turn for the motive gas, greatly reducing flow losses associated with the prior art Enfield-Andreau WECS.

Since the aerodynamic flow for the preferred embodiment replaces the standard mechanical transmission of many prior art WECS, the weight of such a transmission is eliminated. Since the weight of a transmission typically exceeds that of the rotor, hub and associated controls, the present invention represents a substantial weight savings. The high speed generator 68 is rather light when compared to standard generators used for wind turbines. The vaneaxial turbine 64 is preferably directly coupled to generator 68 via shaft 66, without requiring step-up gearing, the generator being operated at a synchronous speed with the rest of the power grid.

The mooring station 26 of the present invention may be located conveniently to the interface to the electrical power grid as long as the winds aloft are of sufficient average strength. Locations of the present invention in a valley, for example, are extremely attractive since same will provide maximum protection to the apparatus when it is retrieved in anticipation of a hurricane, for example. In a worst case storm, the envelope may be deflated. Dramatic savings may be realized with the present invention for off-shore sites that enjoy the most favorable wind regimes. WECS located off-shore may be tethered to anchors, for example, which would be much cheaper than floor-based tower structures. Additionally, off-shore WECS may be towed to their sites and can generate power during the process of towing. Assembly and check out may be accomplished at a shore station prior to towing. Additionally, maintenance, repair and modification may be done at the shore base. Clearly, the design of the present invention will not require structure to oppose the fury of sea waves during storms.

Environmentally, it is by now appreciated that windmills are non-polluting devices that, if reasonably efficient, can greatly assist the energy situation. Although the present invention is quiet compared to other mechanical equipment, the device may be placed high enough so that it would be soundless to personnel on the ground. Aesthetically, the invention is a dramatic improvement over conventional ground-based machines. The high altitudes and thin cables render a degree of near invisibility for personnel at the mooring site, and a reduction in apparent size for distant observers.

It may be appreciated that the present invention provides many solutions to the disadvantages and deficiencies of the prior art WECS. Since the surface-to-volume ratio of gas envelopes becomes more favorable with increased size, and because wind rotors become cheaper per square foot of swept area with increased size, an economical WECS according to the present invention will be quite large. For example, it is estimated that machines having 200 foot rotor diameters are feasible. Much larger sizes, capable of generating 10 megawatts, may also be achieved.

Obviously, numerous modifications and variations of the present invention are possible in light of the above teachings. For example, electric heaters could be provided for anti-ice and de-icing purpose. It is therefore to be understood that within the scope of the appended claims, the invention may be practiced otherwise than as specifically described herein.

I claim as my invention:

1. Apparatus, which comprises:
   a lighter than air structure including an enclosed gas-filled envelope;
   means supported by said ligher than air structure for generating electricity, said means including a main rotor adapted to be rotated by the wind, a diffuser mounted within said envelope and coupled to rotate with said main rotor, a turbine in fluid communication with said diffuser, and an electrical generator coupled to said turbine; and
   means connected between said ligher than air structure and the ground for tethering said structure and for delivering electricity from said generator.

2. The apparatus as set forth in claim 1, wherein said diffuser includes a gas inlet and a gas outlet.

3. The apparatus as set forth in claim 2, wherein said diffuser comprises a plurality of vanes, one end of each of said vanes positioned near said gas inlet, the other end of each of said vanes positioned adjacent said gas outlet.

4. The apparatus as set forth in claim 3, wherein said diffuser further comprises a pair of cover plates between which said vanes are mounted, said gas inlet positioned in the center of one of said plates, said gas outlet located on the periphery thereof.

5. The apparatus as set forth in claim 4, wherein said vanes are curved and extend radially outwardly from said gas inlet to said gas outlet.

6. The apparatus as set forth in claim 5, wherein said main rotor comprises a pair of rotor blades connected to a hub, and further including a drive shaft connecting said hub to said diffuser so that said diffuser rotates therewith.

7. The apparatus as set forth in claim 2, wherein said turbine is positioned within said gas inlet of said diffuser.

8. The apparatus as set forth in claim 7, wherein said turbine, said diffuser and said generator are positioned within a nose cowling form at the fore portion of said envelope.

9. The apparatus as set forth in claim 8, wherein said diffuser is adapted, upon rotation thereof, to draw gas from said gas-filled envelope through said gas inlet and expel some through said gas outlet.

10. The apparatus as set forth in claim 9, wherein said turbine includes impeller blade means adapted to be rotated by the gas drawn through said gas inlet of said diffuser.

11. The apparatus as set forth in claim 10, wherein said electrical generator is positioned forwardly of said turbine.

12. The apparatus as set forth in claim 6, wherein said drive shaft extends through said envelope substantially along the longitudinal axis thereof.

13. The apparatus as set forth in claim 12, further comprising bearing means positioned at spaced locations along said drive shaft for supporting same, and means connected to said structure for supporting said bearing means.

14. The apparatus as set forth in claim 13, wherein said bearing means comprise gas bearings that utilize said gas within said envelope.

15. The apparatus as set forth in claim 13, wherein said means for supporting said bearing means includes a rigid support structure coupled to the forwardly positioned bearing means, and support hangers coupled to the remaining bearing means.

16. The apparatus as set forth in claim 1, 6 or 13, wherein said main rotor is connected to the rear of said envelope and rotates in a plane which is substantially perpendicular to the longitudinal axis of said envelope.

17. The apparatus as set forth in claim 1, wherein said means connected between said lighter than air structure and the ground comprises at least one tethering cable means and at least one electrical cable means.

18. The apparatus as set forth in claim 17, further comprising means positioned on the ground for mooring said cable means which includes means for selectively drawing in said cable means and thereby bringing said structure closer to the ground.

19. The apparatus as set forth in claim 18, wherein said cable means includes at least two cables, one of which is connected to the fore portion of said structure, said mooring means including a beam pivotally coupled to a support pedestal and having one of said cables connected to each end thereof.

20. The apparatus as set forth in claim 19, further comprising outriggers extending laterally from said lighter than air structure to which said cables are connected.

* * * * *